United States Patent [19]

Jaffré et al.

[11] Patent Number: 4,805,190

[45] Date of Patent: Feb. 14, 1989

[54] DETECTOR LOGIC CIRCUIT FOR A SYCHRONOUS TRANSMISSION SYSTEM FOR DATA COMPRISING TERNARY SYMBOLS AND CONTROLLED PARTIAL RESPONSE CLASS 1, N=2 TYPE INTERSYMBOL INTERFERENCE

[75] Inventors: Pierre Jaffré, Lannion; Bernard Le Mouel, Gouzabas; Jean-François Robin, Plounevez Moedec; Pierre Thépaut, Lannion, all of France

[73] Assignee: Alcatel Cit, Paris, France

[21] Appl. No.: 78,625

[22] Filed: Jul. 28, 1987

[30] Foreign Application Priority Data

Jul. 28, 1986 [FR] France ................ 86 10926

[51] Int. Cl.⁴ .............................. H04L 3/00
[52] U.S. Cl. ....................... 375/17; 375/18; 341/57
[58] Field of Search ............... 375/17–20, 375/34, 102; 340/347 DD; 328/162

[56] References Cited

U.S. PATENT DOCUMENTS

| | | | |
|---|---|---|---|
| Re. 30,182 | 12/1979 | Howson ............ | 340/347 D D |
| 3,388,330 | 6/1968 | Kretzmer ............ | 375/18 |
| 3,478,267 | 11/1969 | Melas ............ | 375/18 |
| 4,472,813 | 9/1984 | Kolke et al. ............ | 340/347 D D |
| 4,571,734 | 2/1986 | Dolivo ............ | 375/18 |
| 4,644,564 | 2/1987 | Dolivo et al. ............ | 375/18 |

*Primary Examiner*—Robert L. Griffin
*Assistant Examiner*—Stephen Chin
*Attorney, Agent, or Firm*—Sughrue, Mion, Zinn, Macpeak & Seas

[57] ABSTRACT

A detector logic circuit restores the value 0 or $\pm 1$ of a ternary symbol converted into a signal on five levels 0, $\pm 1$ and $\pm 2$ as a result of class 1, type n=2 partial response transmission. Employing only binary logic circuits, it is connected to the output of a comparator which has four thresholds and which delivers a value representing the receive level by four binary signals. Two of these signals indicate positive overshooting of extreme and intermediate positive thresholds. The other two indicate negative overshooting of negative extreme and intermediate thresholds. The circuit delivers the values of the ternary symbols detected in the form of two binary components which are available at the output and stored for the duration of a symbol by two flip-flops. Both are generated by combinational logic devices of similar design utilizing OR and NOR gates.

5 Claims, 1 Drawing Sheet

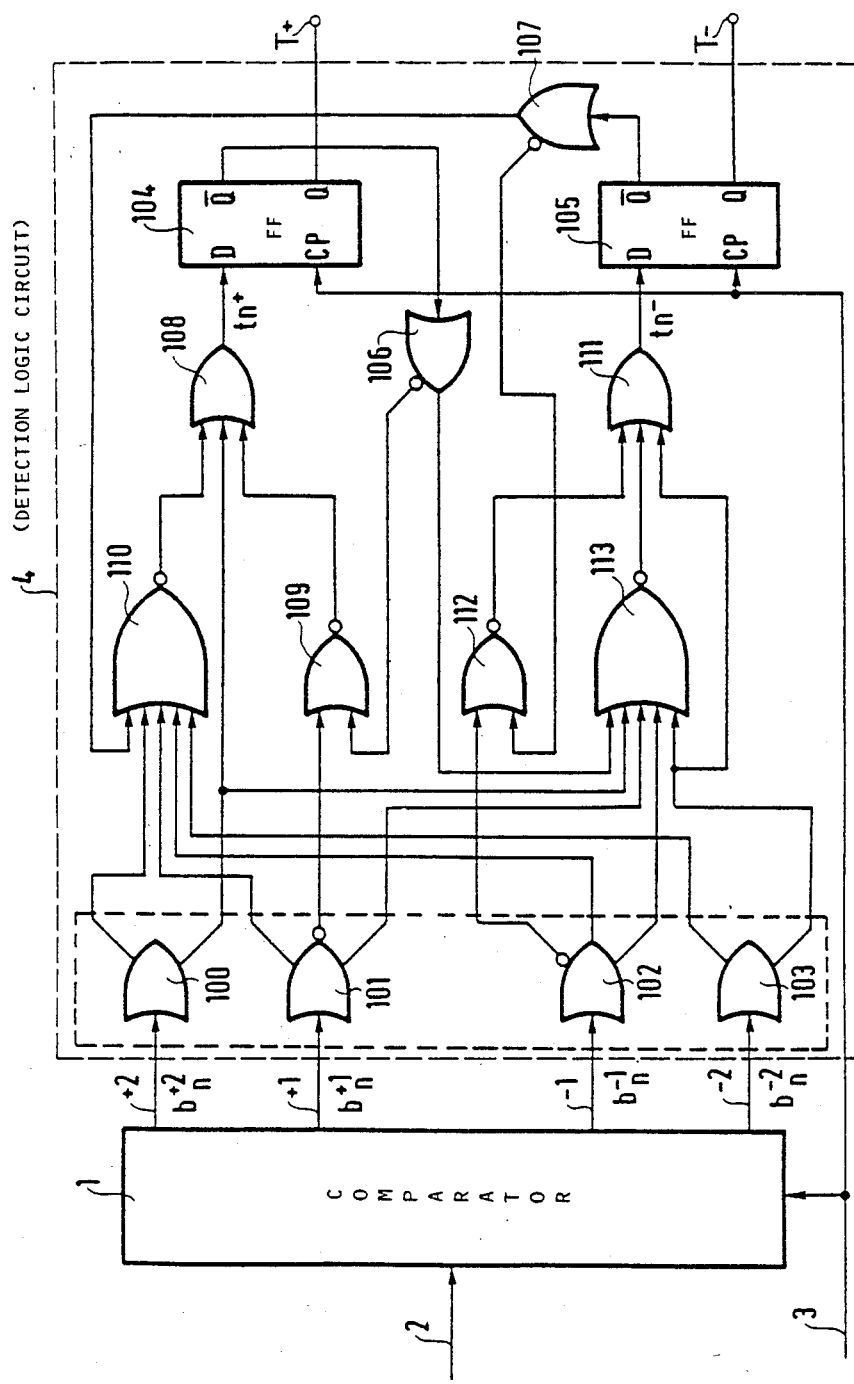

DETECTOR LOGIC CIRCUIT FOR A SYCHRONOUS TRANSMISSION SYSTEM FOR DATA COMPRISING TERNARY SYMBOLS AND CONTROLLED PARTIAL RESPONSE CLASS 1, N=2 TYPE INTERSYMBOL INTERFERENCE

BACKGROUND OF THE INVENTION

1. Field of the Invention

The present invention relates to synchronous digital transmission.

2. Description of the Prior Art

For this type of transmission, which often features transformer coupled lines, use is generally made of a signal having no DC or low-frequency components and made up of a synchronous stream of multivalent, usually ternary, symbols coding the binary data to be transmitted. Being conveyed by channels of necessarily limited bandwidth, these symbols are subjected to attenuation and distortion which render them unrecognizable after a particular transmission distance.

The forms of distortion having the highest nuisance value include intersymbol interference. An attempt is usually made to avoid such interference by applying criteria established by Nyquist, that is to say be conferring on the equalized transmission channel a frequency response such that the sum of the amplitudes of two frequencies symmetrical to the half-frequency of the symbols is constant. The most commonly used of these frequency responses is the so-called raised cosine response which is characterized by the band percentage utilized in excess relative to the symbols half-frequency $f_1$, known as the "roll-off" factor, the value of which is often chosen as 0.7 to limit individual deformation of the symbols (aperture of the eye diagram) to an acceptable level.

An alternative to eliminating intersymbol interference is to control it. This is the object of the so-called partial response technique as described, for example, in U.S. Pat. No. 3,388,330. This technique entails modeling the response of the transmission channel in such a way that its impulse response is spread over an integer multiple of the symbol duration T and so that the signal at the receiving end for a sequence of symbols results from a linear combination of waveforms in $[\sin(\pi t/T)]/(\pi t/T)$ each having for its origin one of the symbols transmitted. This technique makes it possible to limit strictly the bandwidth of the transmission channel in the high-frequency domain to the symbol half-frequency $f_1$ and therefore to minimize thermal noise relative to transmission without intersymbol interference, at the cost of an increase in the number of levels to be distinguished at the receiving end.

For some type channels, transmission with partial response type controlled intersymbol interference is more advantageous than transmission without intersymbol interference as it improves the signal-to-noise ratio, the advantage of reducing the thermal noise outweighing the disadvantage of increasing the number of levels at the receiving end.

There are various classes of partial response depending on the linear combination of symbols obtained at the receiving end, each of these classes being subdivided according to the number of symbols in the combination.

Class 1, type n=2 is one of those most commonly employed. It is defined by a transfer characteristic for the equalized transmission channel defined by the equation:

$$H(f) = \cos \pi T f$$

which produces at the receiving end for each symbol transmitted a signal resulting from the superposition of two consecutive waveforms in $\sin[(\pi t/T)]/(\pi t/T)$ offset by one period T and each assigned a multiplication coefficient corresponding to the level of the original symbol. On sampling a received symbol corresponding to the transmission of ternary symbols with levels 0, ±1 there are obtained five possible values of amplitude denoted 0, ±1, ±2 and corresponding to addition of the level of the ternary symbol transmitted to that of the symbol which immediately preceded it. Detection consists in the converse operation, that is to say in subtracting the level of the previously detected symbol on sampling the signal received. Utilizing the level of the previously detected symbol, this process is subject to error propagation which is, however, limited by the fact that the extreme sampling levels of the received signal correspond to a transmitted symbol having an extreme value of the same sign as these levels and can only result from the superposition of two consecutive symbols of this type.

An object of the present invention is a logic circuit which implements this detection operation at high speed and with limited propagation of errors and which is easy to integrate.

SUMMARY OF THE INVENTION

The present invention consists in a detector logic circuit for a synchronous transmission system for data comprising ternary symbols taking zero, positive and negative values (0, ±1) in which controlled partial response class 1, n=2 intersymbol interference produces in response to reception of each ternary symbol a signal on five levels (0, ±1, ±2,) resulting from linear superposition of each ternary symbol and the preceding ternary symbol, said detector logic circuit operating on the basis of threshold overshoot signals delivered by a comparator which defines the level of the signal received relative to four thresholds, positive and negative extreme thresholds and positive and negative intermediate thresholds, situated between the five possible values of the receive level, delivering the value of the detected ternary symbol Sn in the form of two binary components $tn^+$ and $tn^-$ of which the positive component $tn^+$ is at logic 1 only when the detected ternary symbol Sn takes the positive value +1 and the negative component $tn^-$ is at logic 1 only when the negative component $tn^-$ is at logic 1 only when the detected ternary symbol Sn takes the negative value −1, said detector logic circuit comprising:

a positive binary component store memorizing the positive binary component $tn^+ - 1$ of the previously detected ternary signal $Sn-1$, a negative binary component store memorizing the negative binary component $tn^- - 1$ of the previously detected ternary signal $Sn-1$, a first combinational logic device adapted to apply logic 1 either to the input of said positive binary component store when said comparator indicates a positive overshoot of its positive extreme threshold or to the input of said negative binary component store when said comparator indicates a negative overshoot of its negative extreme threshold, a second combinational logic device adapted to apply logic 1 either to the input of said positive binary component store when said comparator indicates a positive overshoot of its positive intermediate threshold and said positive binary component store holds a logic 0 or to the input of the negative binary component store when said comparator indicates a negative overshoot of its negative intermediate threshold and said negative component store holds a logic 0, and a third combinational logic device adapted to apply to the input of each of said binary component stores the logic level at the output of the other of said binary component stores when said comparator does not indicate any positive overshoot of said positive thresholds or any negative overshoot of said negative thresholds.

Other characteristics and advantages of the invention will emerge from the following description of one embodiment thereof given by way of example only with reference to the appended drawing.

BRIEF DESCRIPTION OF THE DRAWING

The drawing shows a block diagram of the detector logic circuit in accordance with the invention.

DESCRIPTION OF THE PREFERRED EMBODIMENT

The detector circuit now to be described is designed to be used for receiving a synchronous stream of ternary symbols taking 0, positive and negative values (0, $\pm 1$) transmitted over a transmission channel having a partial response type frequency response of class 1, type $n=2$. It is adapted to have its input connected to the output of a comparator serving to identify that of five possible values (0, $\pm 1$, $\pm 2$) taken by the level of the current received symbol signal.

The comparator 1 has four thresholds evenly distributed between the five possible levels of the received signal. It comprises, for example, a set of four elementary threshold comparators which process in parallel the receive signal applied to an input 2 and which are followed by buffer registers sampling their outputs at the center of the received symbol (the center of the eye diagram) under the control of a symbol timing clock signal applied to an input 3 and recovered at the receiving end by the usual techniques. It has four parallel binary outputs each corresponding to the output of one elementary threshold comparator:

a +2 output which corresponds to the elementary comparator having the extreme positive threshold, between the levels +1 and +2 of the received signal, and on which is available after sampling during detection of a received symbol Sn a logic positive threshold overshoot signal $b_n{}^{+2}$ indicating by a level logic 1 that this threshold has been overshot positively and thus that the level of the received signal is +2, A +1 output which corresponds to the elementary comparator having the intermediate positive threshold, between the levels 0 and +1 of the received signal, and on which is available after sampling during detection of a received symbol Sn a positive threshold overshoot logic signal $b_n{}^{+1}$ indicating by a level logic 1 that this threshold has been overshot positively and thus that the level of the received signal is +1 or +2, a −2 output which corresponds to the elementary comparator having the extreme negative threshold, that is to say situated between the levels −1 and −2 of the received signal and on which is available after sampling during detection of a received symbol Sn a negative thresholds overshoot logic signal $b_n{}^{-2}$ indicating by a level logic 1 that this threshold has been overshot negatively and therefore that the level of the received signal is −2, and a −1 output which corresponds to the elementary comparator having the intermediate negative threshold, between the levels 0 and −1 of the receive signal, and on which is available after sampling during detection of a received symbol Sn a negative threshold overshoot logic signal $b_n{}^{-1}$ indicating by a level logic 0 that this threshold has been overshot negatively and therefore that the level of the received signal is −1 or −2.

The table below summarizes the logic state for the signals indicating overshooting of the thresholds $b_n{}^{+2}$, $b_n{}^{+1}$, $b_n{}^{-1}$, $b_n{}^{-2}$ of the comparator according to the sampling level 0, $\pm 1$ or $\pm 2$ of the received signal:

|  | −2 | −1 | 0 | +1 | +2 |
| --- | --- | --- | --- | --- | --- |
| $b_n{}^{+2}$ | 0 | 0 | 0 | 0 | 1 |
| $b_n{}^{+1}$ | 0 | 0 | 0 | 1 | 1 |
| $b_n{}^{-1}$ | 1 | 1 | 0 | 0 | 0 |
| $b_n{}^{-2}$ | 1 | 0 | 0 | 0 | 0 |

The detector logic circuit 4 on the output side of the four-threshold comparator 1 delivers the value of the detected ternary symbol Sn in the form of two binary components of which one, the so-called positive component $tn^+$ is at logic 1, only when the detected ternary symbol has the value +1 and the other, the so-called negative component $tn^-$ is at logic 1 only when the detected ternary signal has the value −1. It comprises an input stage of four amplifiers 100, 101, 102, 103 with inverting and non-inverting outputs distributing complemented and non-complemented versions of the binary threshold overshoot signals $b_n{}^{+2}$, $b_n{}^{+1}$, $b_n{}^{-1}$, $b_n{}^{-2}$, delivered by the four-threshold comparator 1 and an output stage comprising two D type flip-flops 104, 105 memorizing the positive binary component $tn^+ - 1$ and the negative binary component $tn^- - 1$ of the previously detected ternary symbol followed by two amplifiers 106, 107 with inverting and non-inverting outputs distributing complemented and non-complemented versions of these binary components.

The D type flip-flops 104, 105 memorizing the positive and negative binary components of the detected ternary symbols are written under the control of the timing clock signal recovered at the receiving end and availale on the input 3. Their non-inverting Q outputs are connected to the outputs T+ and T− of the detector logic circuits on which are available the positive binary component $tn^+ - 1$ and the negative binary component $tn^- - 1$ of the previously detected ternary symbol Sn−1 while their inverting $\overline{Q}$ outputs are connected to the amplifiers 106, 107.

The positive binary component $tn^+$ of the ternary symbol Sn being detected applied to the D input of the flip-flop 104 comes from an OR gate 108 corresponding to the various linear superposition situations that can arise at the receiving end from transmission of a ternary symbol Sn of value +1.

A first input of the OR gate 108 is connected directly to the output of the amplifier 100. It serves to impose on the positive binary component $tn^+$ of the ternary symbol Sn being detected a level logic 1 originating from the signal $b_n{}^{+2}$ indicating positive overshooting of the positive extreme threshold. A level of +2 at the receiving end can only have been caused by the superposition of two consecutive ternary symbols $S_{n-1}$ and $S_n$ of value $+1$.

A second input of the OR gate 108 is connected to the inverting outputs of the amplifiers 101 and 106 by a two-input NOR gate 109. It serves to impose on the positive binary component $tn^+$ of the ternary symbol $S_n$ being detected a level logic 1 originating from the signal $b_n{}^{+1}$ indicating positive overshooting of the positive intermediate threshold when the positive binary component $tn^+ - 1$ of the ternary symbol $S_{n-1}$ previously detected is at logic 0. A level equal to or greater than $+1$ at the receiving end can only have been caused by the transmission of a ternary symbol $S_n$ of value $+1$ in the case where the previously detected ternary symbol $S_{n-1}$ did not have the value $+1$.

A third input of the OR gate 108 is connected to the non-inverted output of the amplifiers 100, 101, 102, 103 and 107 by a five-input NOR gate 110. This serves to impose on the positive binary component $tn^+$ of the ternary symbol $S_n$ being detected a level logic 1 originating from the negative binary component of the previously detected ternary symbol when all the threshold overshoot signals $b_n$ are at logic 0 reflecting a receive level of 0. A receive level of 0 can only have been caused by the transmission of a ternary symbol $S_n$ of value 1 in the case where the previously detected ternary symbol $S_{n-1}$ had the value $-1$.

All these cases are embodied in the logic equation below defining the positive binary component $tn^+$ of the symbol $S_n$ being detected:

$$tn^+ = b_n{}^{+2} + b_n{}^{+1} \cdot \overline{tn^+ - 1} + \overline{b_n{}^{+2}} \cdot \overline{b_n{}^{+1}} \cdot \overline{b_n{}^{-1}} \cdot \overline{b_n{}^{-2}}.$$
$$tn^- - 1$$

In a similar way, the negative binary component $tn^-$ of the ternary symbol $S_n$ being detected applied to the D input of the flip-flop 105 is from a three-input OR gate 111 corresponding to the various cases of linear superposition that can result at the receiving end from transmission of a ternary symbol $S_n$ of value $-1$.

A first input of the OR gate 111 is connected direct to the output of the amplifier 103. It serves to impose on the negative binary component $tn^-$ of the ternary symbol $S_n$ being detected a level logic 1 originating from the signal $b_n{}^{-2}$ indicating overshooting of the negative extreme threshold. A receive level of $-2$ can only have been caused by the superposition of two consecutive ternary symbols $S_n$ and $S_{n-1}$ of value $-1$.

A second input of the OR gate 111 is connected to the inverting outputs of the amplifiers 102 and 107 by a two-input NOR gate 112. This serves to impose on the negative binary component $tn^-$ of the ternary symbol $S_n$ being detected a level logic 1 originating from the signals indicating negative overshooting of the negative intermediate threshold $b_n{}^{-1}$ when the negative binary component $tn^- - 1$ of the previously detected ternary symbol $S_{n-1}$ is at logic 0. A receive level equal to or less than $-1$ can only have been caused by the transmission of a ternary symbol $S_n$ of value $-1$ in the case where the previously detected ternary symbol $S_{n-1}$ did not have the value $-1$.

A third input of the OR gate 111 is connected to the non-inverting outputs of the amplifiers 100, 101, 102, 103 and 106 by a five-input NOR gate 113. This serves to impose on the negative binary component $tn^-$ of the ternary symbol $S_n$ being detected a level logic 1 originating from the positive binary component $tn^+ - 1$ of the previously detected ternary symbol $S_{n-1}$ when all the threshold overshoot signals $b_n$ are at logic 1 reflecting a receive level of 0. A receive level of 0 can only have been caused by the transmission of a ternary symbol $S_n$ of value $-1$ in the case where the previously detected ternary symbol $S_{n-1}$ was of value $+1$.

All of these situations are embodied in the logic equation below defining the negative binary component $tn^-$ of the symbol $S_n$ being detected:

$$tn^- = b_n{}^{-2} + b_n{}^{-1} \cdot \overline{tn^- - 1} + \overline{b_n{}^{+2}} \cdot \overline{b_n{}^{+1}} \cdot \overline{b_n{}^{-1}} \cdot \overline{b_n{}^{-2}}.$$
$$tn^+ - 1$$

This detection process minimizes propagation of errors. This is non-existent for the two extreme receive levels $\pm 2$ which result in detection without consideration as to the value of the previously detected ternary symbol $S_{n-1}$. Also, a correction is applied in the erroneous case where the receive level is respectively $+1$ or $-1$ when the previously detected ternary symbol was respectively of value $-1$ or $+1$.

The resulting detector logic circuit is very fast, the signals having to pass through at most three layers of logic gates.

Certain arrangements as described may be modified and certain devices as described may be replaced by equivalent devices without departing from the scope of the invention.

We claim:

1. Detector logic circuit for a synchronous transmission system for data comprising ternary symbols taking zero, positive and negative values $(0, \pm 1)$ in which controlled partial response class 1, $n=2$ intersymbol interference produces in response to reception of each ternary symbol a signal on five levels $(0, \pm 1, \pm 2,)$ resulting from linear superposition of each ternary symbol and the preceding ternary symbol, said detector logic circuit operating on the basis of threshold overshoot signals delivered by a comparator which defines the level of the signal received relative to four thresholds, positive and negative extreme thresholds, situated between the five possible values of the receive level, delivering the value of the detected ternary symbol $S_n$ in the form of two binary components $tn^+$ and $tn^-$ of which the positive component $tn^+$ is at logic 1 only when the detected ternary symbol $S_n$ takes the positive value $+1$ and the negative component $tn^-$ is at logic 1 only when the detected ternary symbol $S_n$ takes the negative value $-1$, said detector logic circuit comprising:

a positive binary component store memorizing the positive binary component $tn^+ - 1$ of the previously detected ternary signal $S_{n-1}$, a negative binary component store memorizing the negative binary component $tn^- - 1$ of the previously detected ternary signal $S_{n-1}$, a first combinational logic device adapted to apply logic 1 either to the input of said positive binary component store when said comparator indicates a positive overshoot of its positive extreme threshold or to the input of said negative binary component store when said comparator indicates a negative overshoot of its negative extreme threshold, a second combinational logic device connected to the first combinational logic device and adapted to apply logic 1 either to the input of said positive binary component store when said comparator indicates a positive overshoot of its positive intermediate threshold and said positive binary component store holds a logic 0 or to the input of the negative binary component store when said comparator indicates a negative overshoot of its negative intermediate threshold and said negative component store holds a logic 0, and a third combinational logic device connected to the first combinational logic device and adapted to apply to the input of each of said binary component stores the logic level at the output of the other of said binary component stores when said comparator does not indicate any positive overshoot of said positive thresholds or any negative overshoot of said negative thresholds.

2. Detector logic circuit according to claim 1, adapted to have its input connected to the output of a comparator having four thresholds and delivering in parallel four threshold overshoot binary signals of which two ($b_n{}^{+2}$ and $b_n{}^{+1}$) are assigned to said positive extreme and intermediate thresholds and are at logic 0 in the absence of any positive overshoot of said positive extreme and intermediate thresholds and the other two ($b_n{}^{-2}$ and $b_n{}^{-1}$) are assigned to said negative extreme and intermediate thresholds and are at logic 0 in the absence of any negative overshoot of said negative extreme and intermediate thresholds, in which detector logic circuit said combinational logic devices are connected to said positive and negative binary component stores in such a way as to verify for the positive binary component $tn^+$ of the symbol Sn applied to the input of said positive binary component store the logic equation:

$$tn^+ = b_n{}^{+2} + b_n{}^{+1} \cdot \overline{tn^+ - 1} + \overline{b_n{}^{+2}} \cdot \overline{b_n{}^{+1}} \cdot \overline{b_n{}^{-1}} \cdot \overline{b_n{}^{-2}}.$$
$$\overline{tn^- - 1}$$

and so as to verify for the negative binary component $tn^-$ of the symbol Sn applied to the input of said negative binary component store the logic equation:

$$tn^- = b_n{}^{-2} + b_n{}^{-1} \cdot \overline{tn^- - 1} + \overline{b_n{}^{+2}} \cdot \overline{b_n{}^{+1}} \cdot \overline{b_n{}^{-1}} \cdot \overline{b_n{}^{-2}}.$$
$$\overline{tn^+ - 1}.$$

3. Detector logic circuit according to claim 2, wherein said first combinational logic device comprises:

a first three-input OR gate having an output connected to the input of said positive binary component store and which receives on a first input the signal from said comparator indicating overshooting of said positive extreme threshold, and a second three-input OR gate having an output connected to the input of said negative binary component store and which receives on a first input the signal from said comparator indicating overshooting of said negative extreme threshold.

4. Detector logic circuit according to claim 3, wherein said second combinational logic device comprises:

a first two-input NOR gate having an output connected to a second input of said first OR gate of said first combinational logic device and which receives on an input the signal from said comparator indicating overshooting of said positive intermediate threshold, complemented by an inverter, and on its other input the output signal from said positive binary component store, and a second two-input NOR gate having an output connected to a second input of said second OR gate of said first combinational logic device and which receives on an input the signal from said comparator indicating overshooting of said negative intermediate threshold, complemented by an inverter, and on its other input the output signal of said negative binary component store.

5. Detector logic circuit according to claim 3, wherein said third combinational logic device comprises:

a first five-input NOR gate having an output connected to a third input of said first OR gate of said first combination logic device and which receives on four inputs the fours signals from said comparator indicating overshooting of the comparator thresholds and on a fifth input the complemented signal from the output of said negative binary component store, and a second five-input NOR gate having an output connected to a third input of said second OR gate of said first combinational logic means and which receives on four inputs the four signals from said comparator indicating overshooting of the comparator threshold and on a fifth input the complemented signal from the output of said positive binary component store.

* * * * *